(12) United States Patent
Sato

(10) Patent No.: US 8,009,319 B2
(45) Date of Patent: Aug. 30, 2011

(54) IMAGE FORMATION DEVICE, IMAGE FORMATION SYSTEM AND IMAGE PROCESSING PROGRAM STORAGE MEDIUM

(75) Inventor: Takahiro Sato, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1040 days.

(21) Appl. No.: 11/474,325

(22) Filed: Jun. 26, 2006

(65) Prior Publication Data

US 2007/0115502 A1 May 24, 2007

(30) Foreign Application Priority Data

Nov. 24, 2005 (JP) ................................. 2005-339304

(51) Int. Cl.
*G06F 3/12* (2006.01)
(52) U.S. Cl. ...... 358/1.18; 358/1.13; 358/1.2; 358/1.15; 358/449; 347/155; 347/156; 399/307; 399/370; 399/376; 399/389
(58) Field of Classification Search .......... 358/1.1–1.15, 358/1.18, 449, 1.2, 1.9; 347/155, 156; 399/296, 399/33, 307, 370, 376, 389
See application file for complete search history.

(56) References Cited

U.S. PATENT DOCUMENTS

| 5,737,677 | A | * | 4/1998 | Tombs et al. | ................. | 399/296 |
| 5,751,432 | A | * | 5/1998 | Gwaltney | ....................... | 358/296 |
| 6,149,323 | A | * | 11/2000 | Shima | .............................. | 400/76 |
| 6,498,656 | B1 | * | 12/2002 | Mastie et al. | ................. | 358/1.15 |
| 6,865,717 | B2 | * | 3/2005 | Wright | ............................. | 715/772 |
| 6,906,820 | B2 | * | 6/2005 | Toyoda et al. | ................. | 358/1.15 |
| 7,154,518 | B2 | * | 12/2006 | Kim | ................................. | 347/185 |
| 2002/0135626 | A1 | | 9/2002 | Sato et al. | | |
| 2004/0046992 | A1 | * | 3/2004 | Mori et al. | .................... | 358/1.15 |
| 2004/0066536 | A1 | | 4/2004 | Takamine et al. | | |
| 2004/0218209 | A1 | | 11/2004 | Hamaguchi et al. | | |
| 2005/0111035 | A1 | | 5/2005 | Takamine | | |
| 2007/0115502 | A1 | * | 5/2007 | Sato | .......................... | 358/1.15 |

FOREIGN PATENT DOCUMENTS

| JP | A 5-122476 | 5/1993 |
| JP | A 10-326167 | 12/1998 |
| JP | 2002-240262 | 8/2002 |
| JP | 2004-127250 | 4/2004 |
| JP | 2004-154960 | 6/2004 |
| JP | 2005-170037 | 6/2005 |
| JP | A-2005-288844 | 10/2005 |
| WO | WO 2004/099968 A1 | 11/2004 |

OTHER PUBLICATIONS

Office Action issued in JP Application No. 2005-339304 on Sep. 7, 2010 (with English translation).

* cited by examiner

*Primary Examiner* — Twyler Haskins
*Assistant Examiner* — Dennis Dicker
(74) *Attorney, Agent, or Firm* — Oliff & Berridge, PLC

(57) ABSTRACT

There is provided an image formation device including: a receiving section, which receives content information of a printing object from a content recording server via a network; a judgement section, which judges a category of the received content information; a specification section, which specifies a printing method and printing parameter in accordance with the judged category; and a printing section, which prints the printing object with the printing method in accordance with the specified printing parameter.

28 Claims, 20 Drawing Sheets

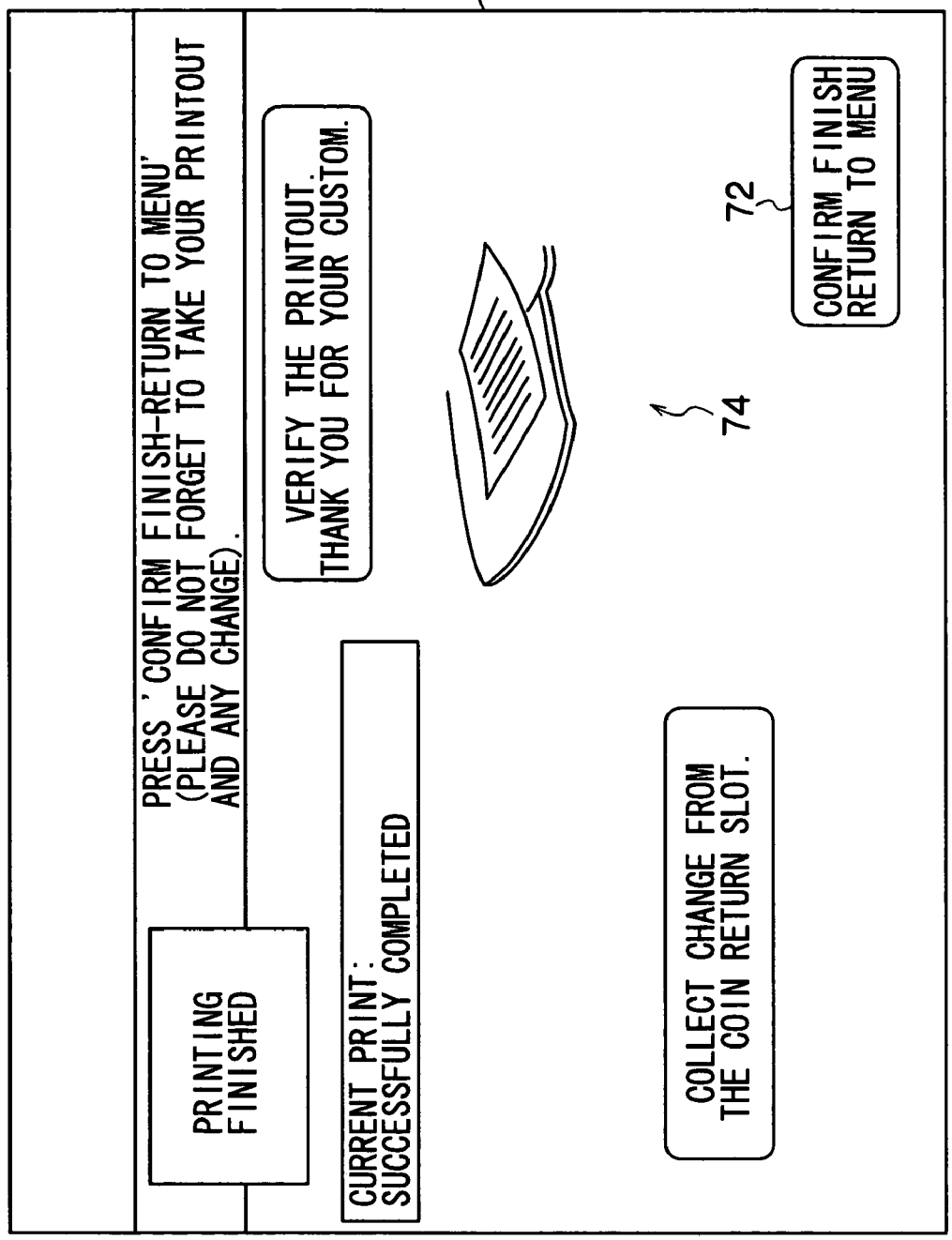

IMAGE FORMATION DEVICE, IMAGE FORMATION SYSTEM AND IMAGE PROCESSING PROGRAM STORAGE MEDIUM

CROSS-REFERENCE TO RELATED APPLICATION

This application claims priority under 35 USC 119 from Japanese Patent Application No. 2005-339304, the disclosure of which is incorporated by reference herein.

BACKGROUND

1. Technical Field

This invention relates to an image formation device, an image formation system and an image processing program, and more particularly relates to an image formation device which is to be installed in a store and provide print services to customers, and to an image formation system thereof and a storage medium storing an image processing program thereof.

2. Related Art

Heretofore, technologies have been proposed for improving convenience characteristics, such as ease of operations and the like, when users are printing documents, images and the like at printers.

Now, multifunction devices (herebelow referred to as MFPs), in which numerous functions such as copying functions, printing functions, fax functions, scanning functions and the like are incorporated, have been widely used heretofore. In recent years, such MFPs have been installed in stores, such as convenience stores and the like, and a network printing service has been proposed, in which an MFP is connected by network to a server at which document data, image data and the like are recorded, downloads document data or the like stored at the server to the MFP, and prints the same.

However, printing methods and printing parameters for optimal printing are different for document data and image data. Therefore, users must implement respective optimal settings of printing methods and printing parameters in accordance with categories of print data, which is a problem in regard to convenience.

SUMMARY

A first aspect of the present invention provides an image formation device including: a receiving section, which receives content information of a printing object from a content recording server via a network; a judgement section, which judges a category of the received content information; a specification section, which specifies a printing method and printing parameter in accordance with the judged category; and a printing section, which prints the printing object with the printing method in accordance with the specified printing parameter.

BRIEF DESCRIPTION OF THE DRAWINGS

Embodiments of the present invention will be described in detail based on the following figures, wherein:

FIG. 20 is a view showing a display example of a document data print completion screen.

DETAILED DESCRIPTION

Figure 1:
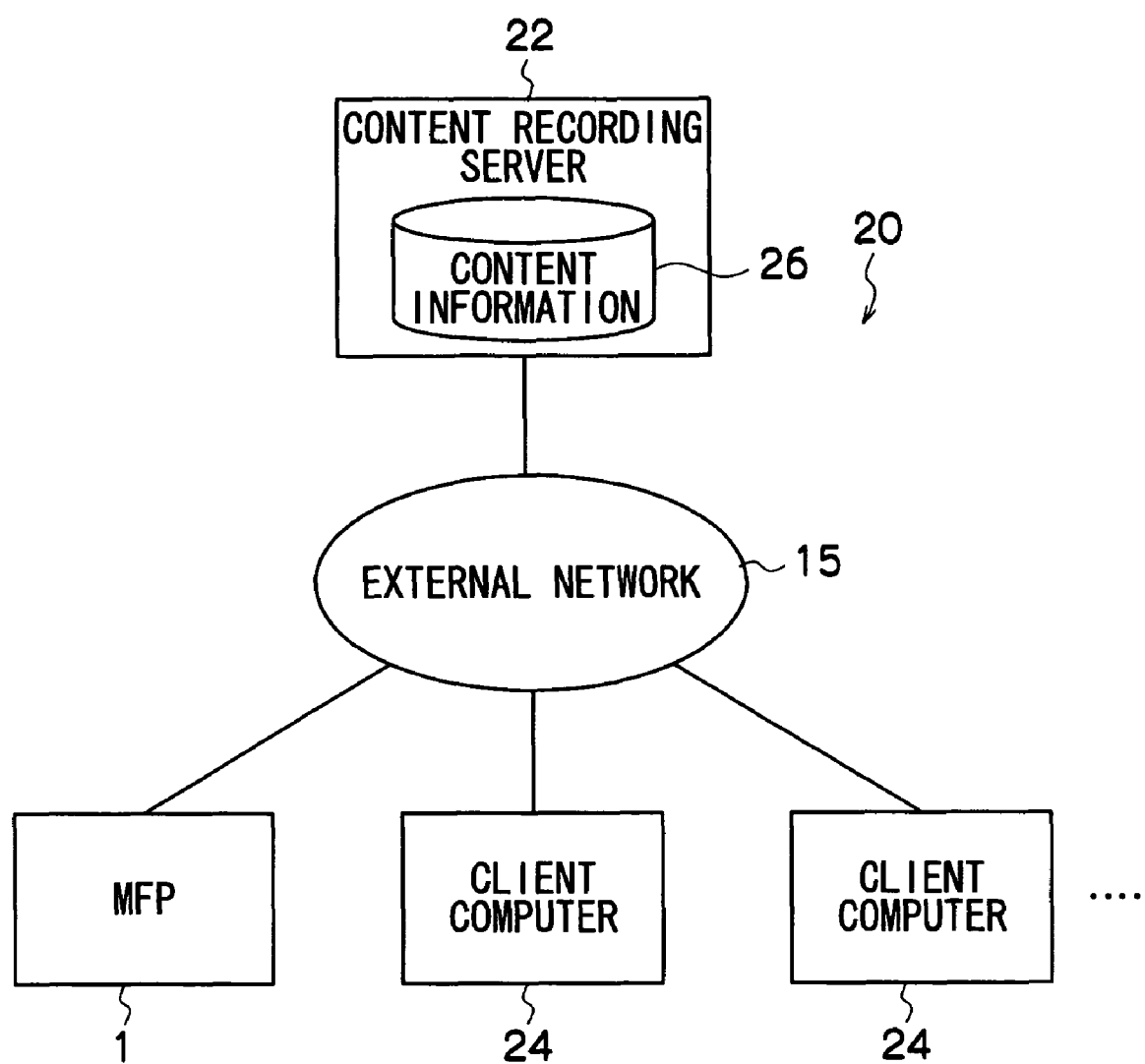
FIG. 1 is a schematic structural diagram of a network printing system.

Herebelow, embodiments of the present invention will be described with reference to the drawings. FIG. 1 is a diagram showing a network printing system 20, to which the present invention is applied.

The network printing system 20 is a system in which a content recording server 22, an MFP 1 and client computers 24 are connected via an external network 15 such as, for example, the Internet or the like.

The content recording server 22 has the structure of a general-purpose computer which is provided with a CPU, a high-capacity storage device, a network interface and so forth. Content information 26, which is uploaded from the client computers 24, is saved (recorded) at the high-capacity storage device. The content information 26 includes content data, such as document data, image data and the like, and attribute data relating to attributes of the content data.

The client computer 24 has the structure of a general-purpose computer which is provided with a CPU, a high-capacity storage device, a network interface, an operation input device such as a keyboard, a mouse or the like, a display device such as a liquid crystal display or the like, and so forth.

Figure 2:
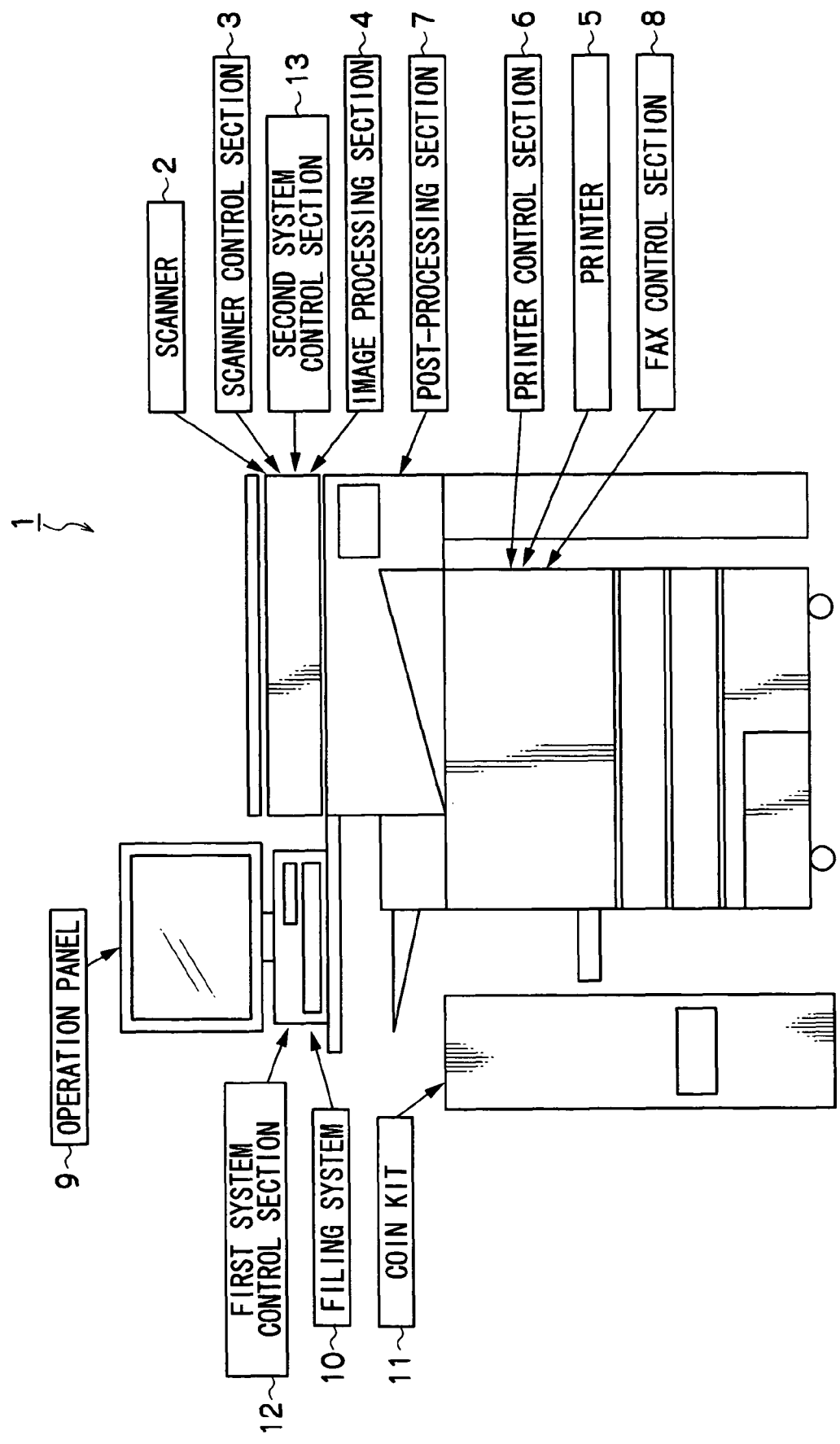
FIG. 2 is an external view of an MFP.

FIG. 2 is a diagram showing an example of external appearance of the MFP 1. The MFP 1 includes a copier function, a fax function, a printer function and a scanner function. As shown in FIG. 2, the MFP 1 is a structure which is equipped with a scanner 2 which reads originals, a scanner control section 3 which controls the scanner 2, an image processing section 4 which performs image processing, a printer 5 which performs primary fixing processing and prints images on paper, a printer control section 6 which controls the printer 5, a post-processing section 7 which carries out post-processing (secondary fixing processing or the like) on paper which has been printed from the printer 5, a fax control section 8 which implements fax communications through a public network 16, and an operation panel 9 such as a liquid-crystal touch panel or the like, which displays UI (user interface) screens for use of the services of the MFP 1 and accepts settings of parameters for the various functions of the MFP 1 from users. The MFP 1 is also equipped with a filing system 10 which administers files at a storage device and/or media, a coin kit 11 at which fees required for use of the services of the MFP 1 are inserted, and a first system control section 12 and second system control section 13, which perform processing for control of these various structural elements.

Figure 3:
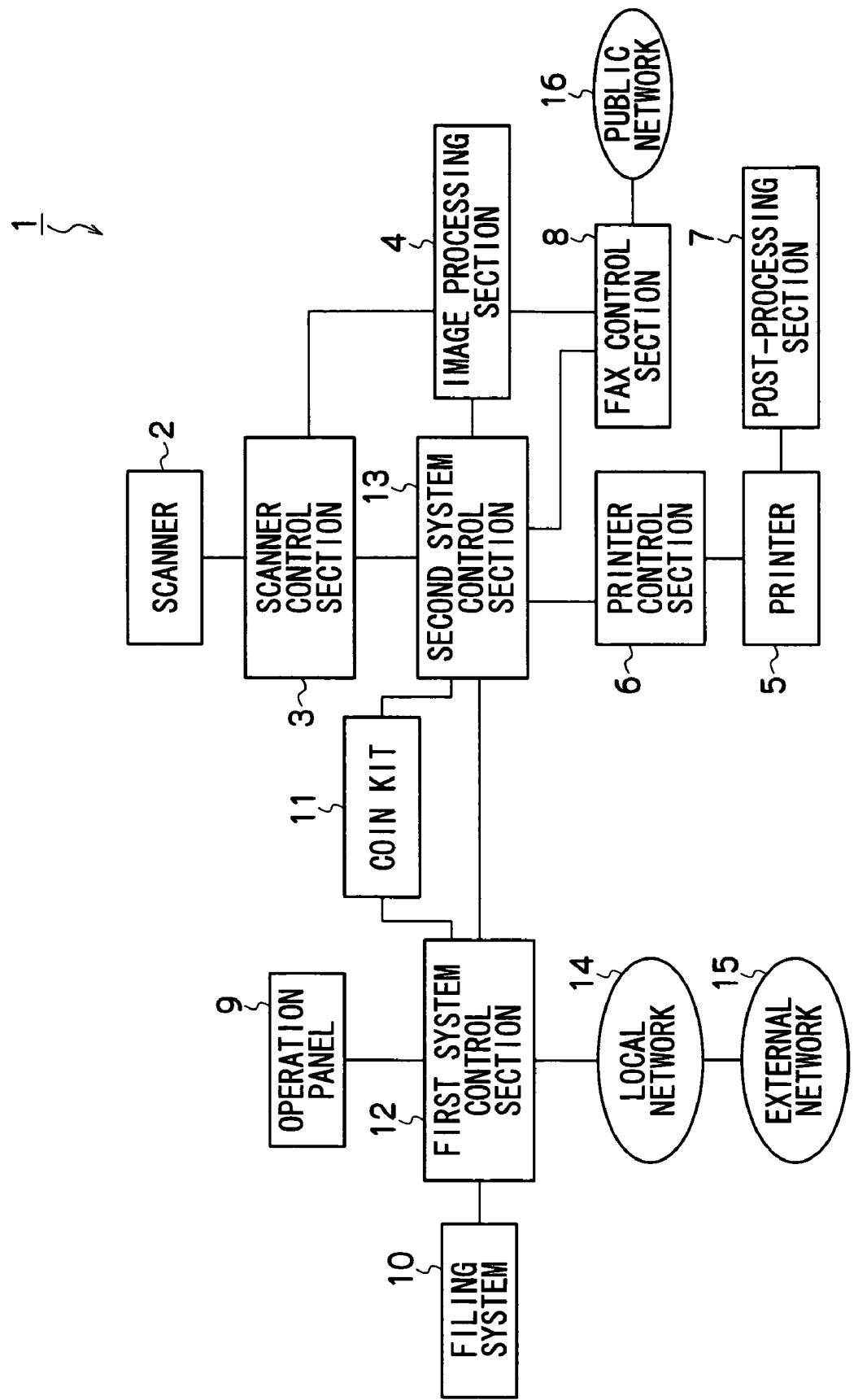
FIG. 3 is a block diagram showing schematic structure of the MFP.

FIG. 3 is a block diagram showing an example of system structure of the MFP 1.

The first system control section 12 is connected to the operation panel 9, controls display of the UI screens at the operation panel 9, and performs processing to create jobs in accordance with the parameters accepted by the operation panel 9. The first system control section 12 is further connected to the filing system 10, and implements management of the filing system 10. The first system control section 12 is also connected to the coin kit 11, accepts information on amounts of money which have been inserted at the coin kit 11, and implements processing of information of the received amounts. The first system control section 12 is also connected to a local network 14, and performs network communications via the external network 15, to which the local network 14 is connected. Further, the first system control section 12 is connected to the second system control section 13, administers transfers to the second system control section 13 of jobs and information on settings of the respective functions, and performs processing for receiving status information of jobs which is transferred from the second system control section 13.

The second system control section 13 performs control of the scanner control section 3, the image processing section 4, the printer control section 6 and the fax control section 8.

The MFP 1 with this structure is installed in a store such as, for example, a convenience store or the like, and provides services such as network printing, copying, faxing, printing from digital cameras, and so forth. For the present embodiment, a network printing service will be described.

Figure 4:
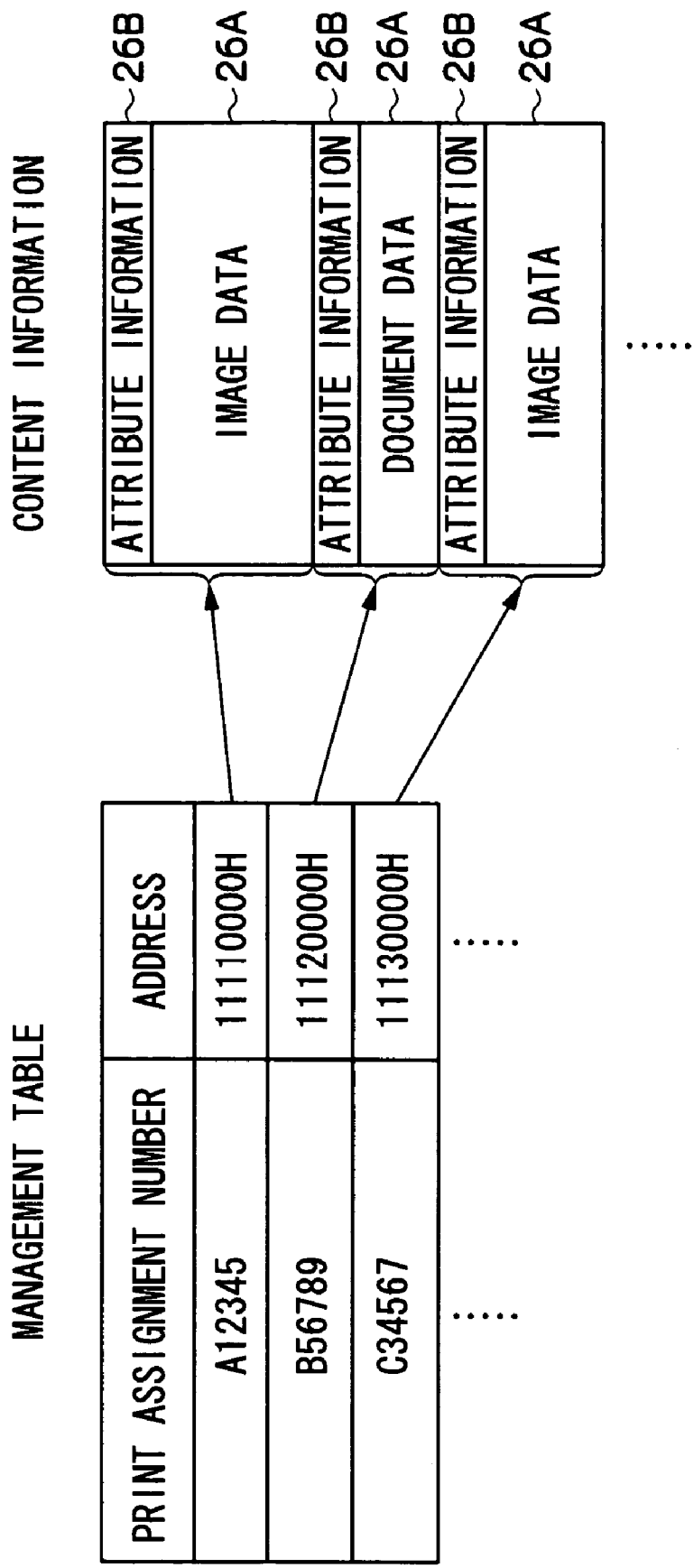
FIG. 4 is a diagram for describing content information which is recorded at a content recording server.

In the network printing service, as will be described in more detail later, initially, a user (an ordinary user, a content provider or the like) uploads required content information 26 to the content recording server 22 from the client computer 24. The content recording server 22 saves (records) the content information 26 that has been uploaded from the client computer 24 to the high-capacity storage device, in association with a print assignment number (an ID code). More specifically, as shown in FIG. 4, a management table, which represents correspondences between print assignment numbers and addresses at which the associated content information 26 is saved, is prepared and stored. Each set of content information 26 includes content data 26A, such as document data, image data or the like, and attribute information 26B relating to attributes of the content data.

The attribute information 26B may include information such as, for example, a paper size for when the document data or image data is to be printed, a paper type, whether printing is in color or black and white, a number of pages of printing, a printing cost per page, and the like.

When a user wishes to print content data which has been recorded to the content recording server 22 at, for example, a business trip destination or the like, the user takes note of the print assignment number corresponding to that content data beforehand. Hence, the user inputs the print assignment number to the MFP 1, which has been installed in a store at the business trip destination, downloads the content data from the content recording server 22, and prints the content data.

Thus, with the network printing service, it is possible to easily execute printing of content data such as document data, image data and the like at such destinations.

Next, processing for recording of the content information 26 which is executed at the client computer 24 and network printing processing which is executed at the MFP 1, which utilize the present embodiment, will be described with reference to the flowcharts shown in FIGS. 5 and 6.

First, the processing for recording the content information 26 which is executed at the client computer 24 will be described. This processing is executed when a user performs operations that instruct execution of this content information recording processing.

Figure 5:
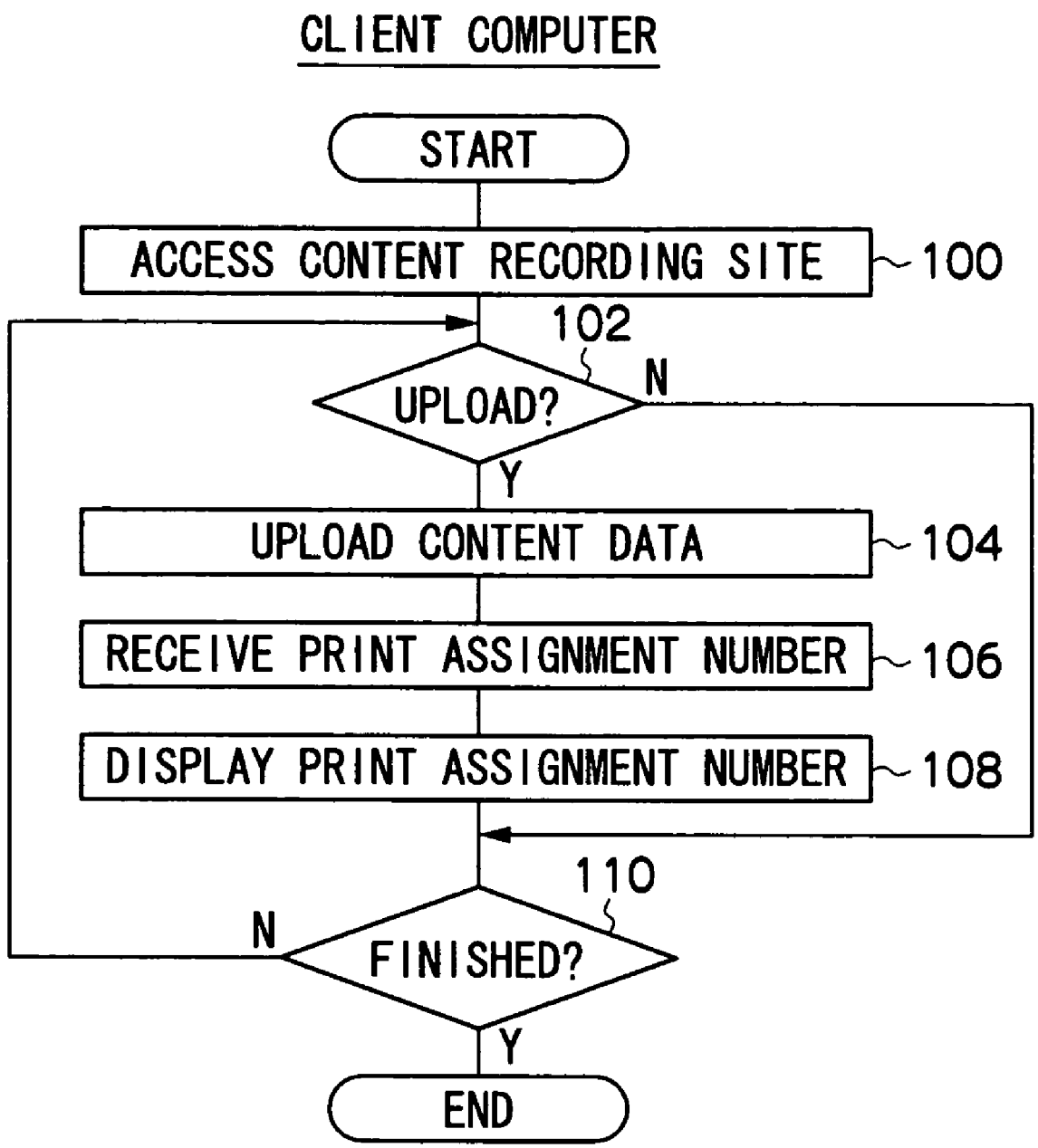
FIG. 5 is a flowchart of content information recording processing, which is executed at a client computer.

As shown in FIG. 5, in step 100, a content recording site which the content recording server 22 hosts is accessed. The content recording server 22 transmits data of a screen for content recording to the client computer 24. In accordance with this screen for content recording, a user designates content information that is to be recorded to the content recording server 22 from among, for example, content information stored at a high-capacity storage device.

For step 102, the user decides whether or not to instruct that the content information 26 be designated and uploaded. If uploading is instructed, the routine advances to step 104, and if uploading is not instructed, the routine advances to step 110.

In step 104, the content information 26 which has been designated as a recording object by the user is uploaded to the content recording server 22. Hence, at the content recording server 22, a print assignment number is applied to the content information which has been uploaded from the client computer 24, this print assignment number and a storage address of the content information 26 are recorded in the management table, and the content information 26 is saved to that storage address. In addition, the content recording server 22 transmits the print assignment number to the client computer 24.

In step 106, the print assignment number transmitted from the content recording server 22 is received, and in step 108, the received print assignment number is shown in an unillustrated display. Thus, the user can be informed of the print assignment number which has been applied to the uploaded content information 26. Here, the print assignment number which has been transmitted from the content recording server 22 may also be stored and kept at a high-capacity storage device.

For step 110, the user decides whether or not to perform an operation for ending the processing of recording the content information 26. If this ending operation is performed, the present routine ends, and if the ending operation is not performed, the routine returns to step 106 and repeats the same processing as described above.

Next, the network printing processing which is executed at the MFP 1 will be described with reference to the flowchart shown in FIG. 6.

Figure 7:
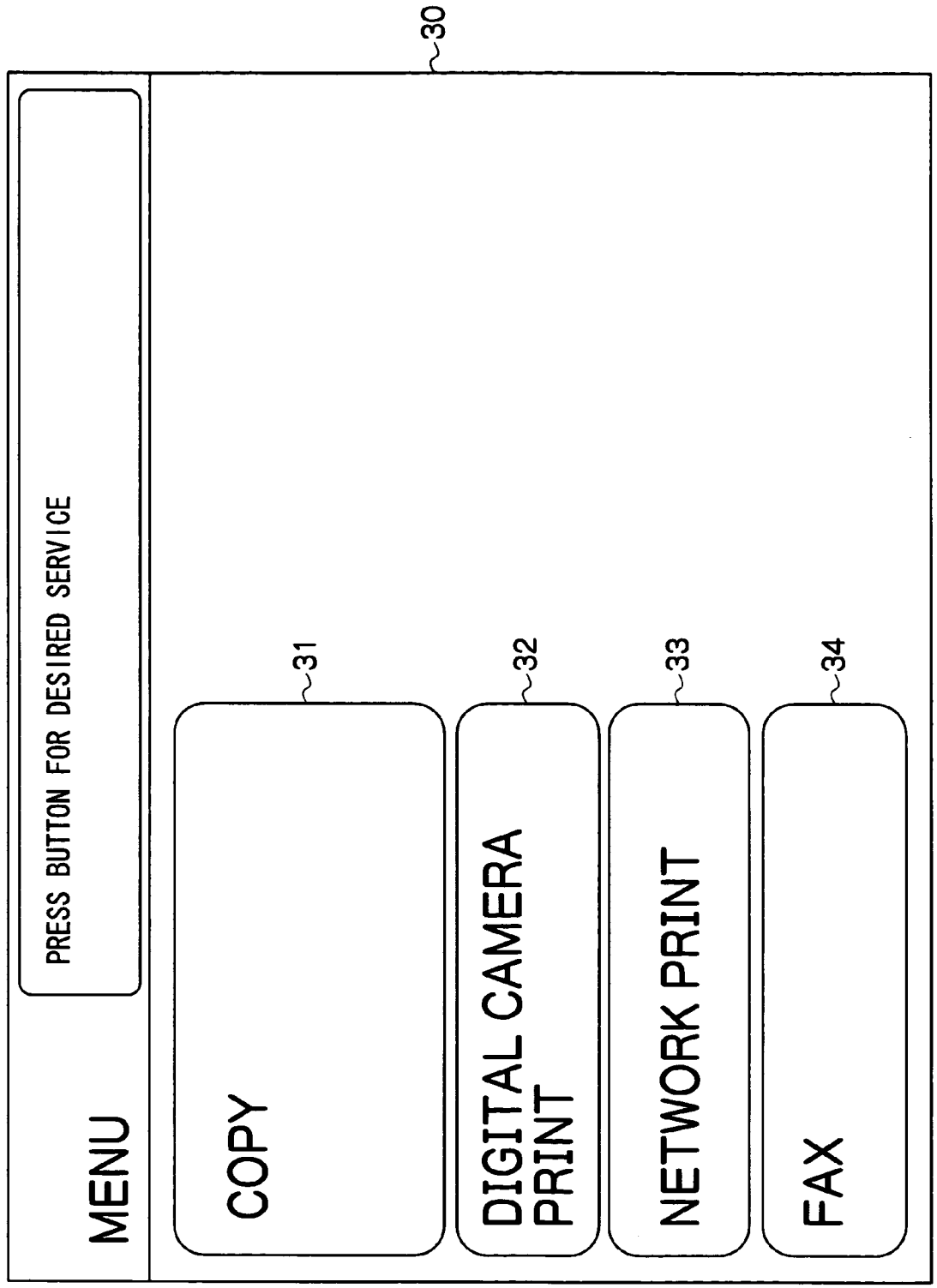
FIG. 7 is a view showing a display example of a menu screen.

When a power supply of the MFP 1 is turned on, a menu screen 30 as shown in FIG. 7 is displayed as a start-up screen. In this menu screen 30, a copy button 31, a digital camera printing button 32, a network printing button 33 and a fax button 34 are displayed. The copy button 31 is pressed when a copying service is to be selected, the digital camera printing button 32 is pressed when a service for printing from digital cameras is to be selected, the network printing button 33 is pressed when the network printing service is to be selected, and the fax button 34 is pressed when a fax service is to be selected.

Figure 6:
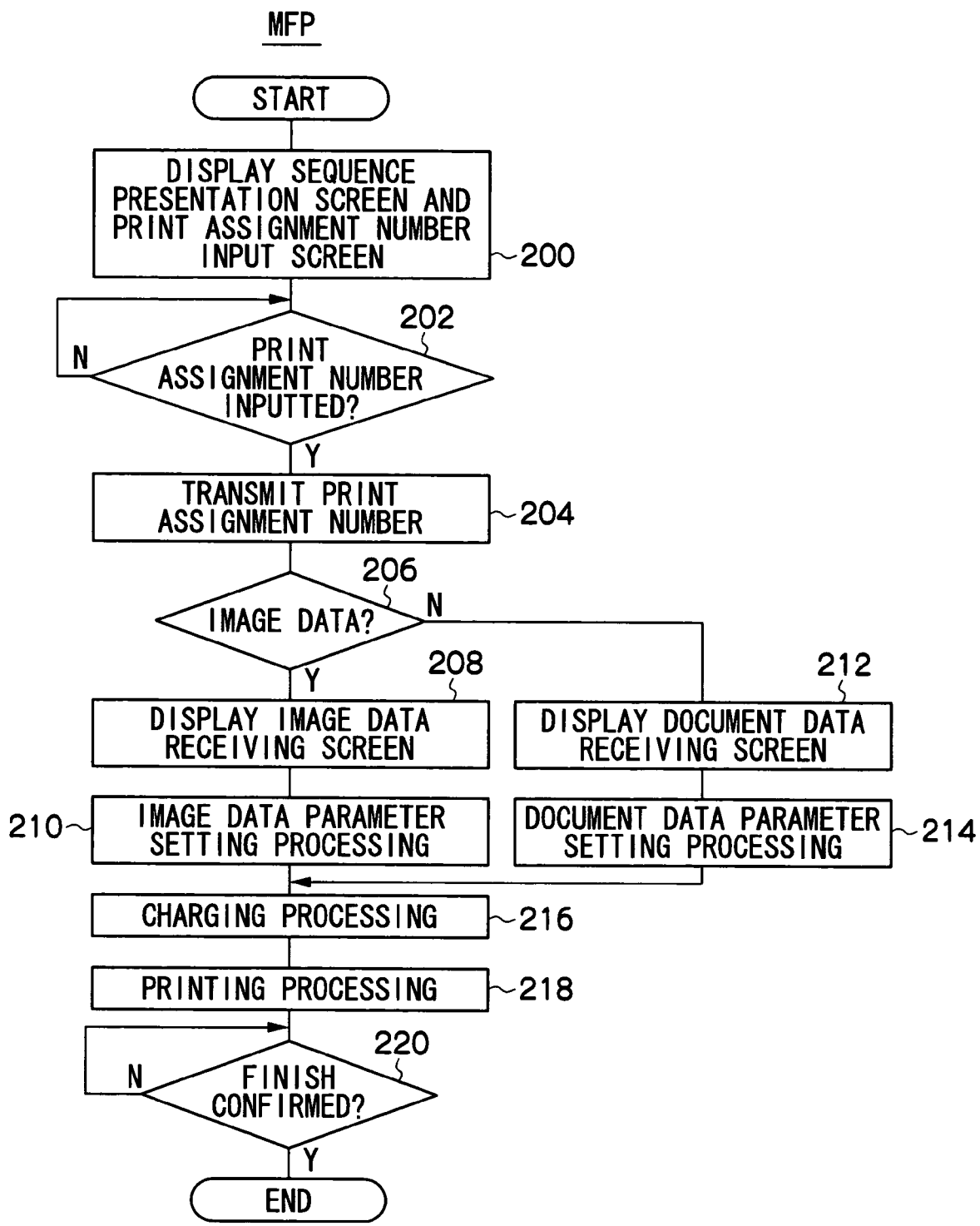
FIG. 6 is a flowchart of network printing processing, which is executed at an MFP.

When a user presses (touches) the network printing button 33 in this screen, the network printing processing shown in FIG. 6 is executed.

Figure 8:
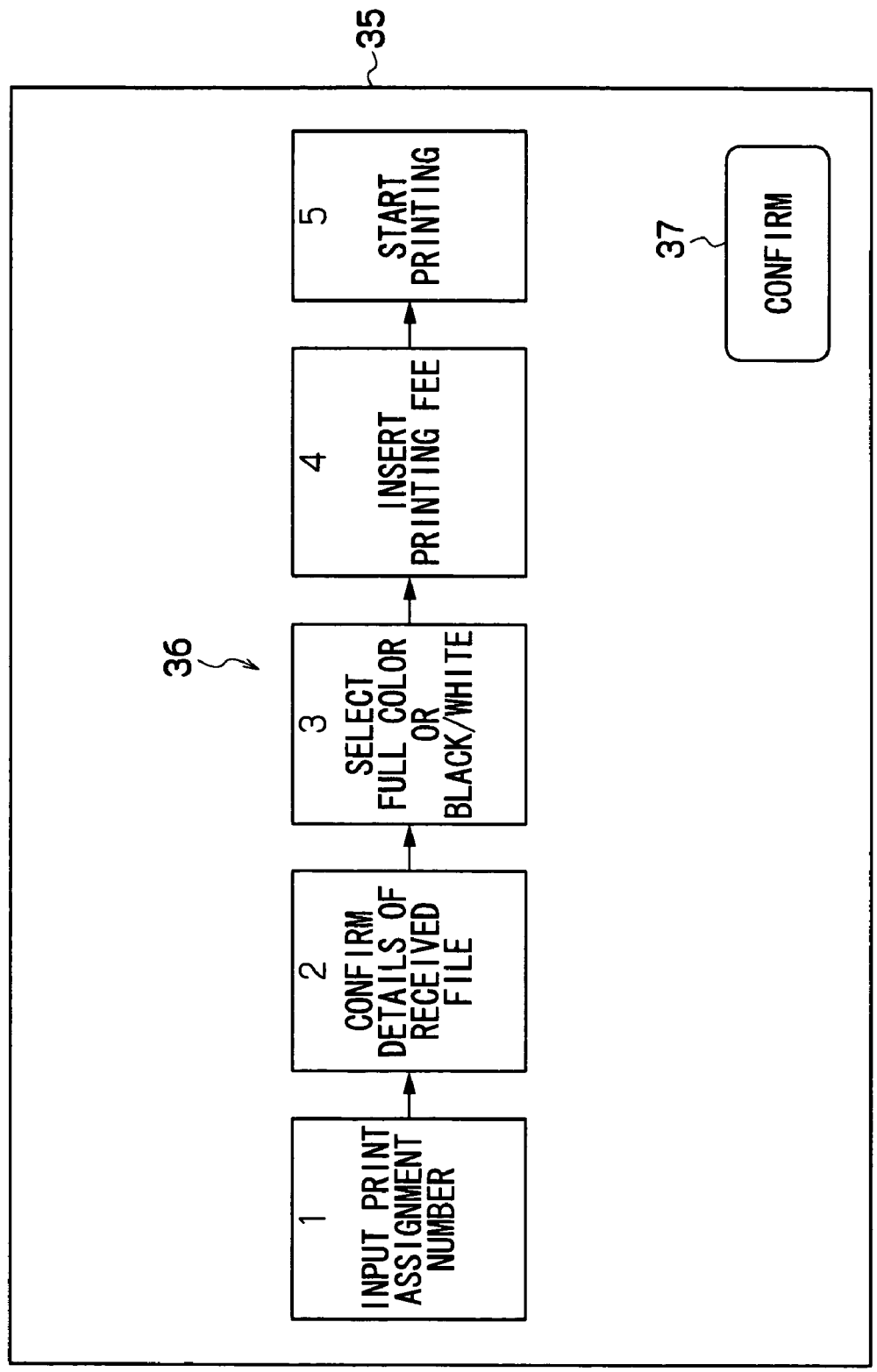
FIG. 8 is a view showing a display example of a sequence presentation screen.
Figure 9:
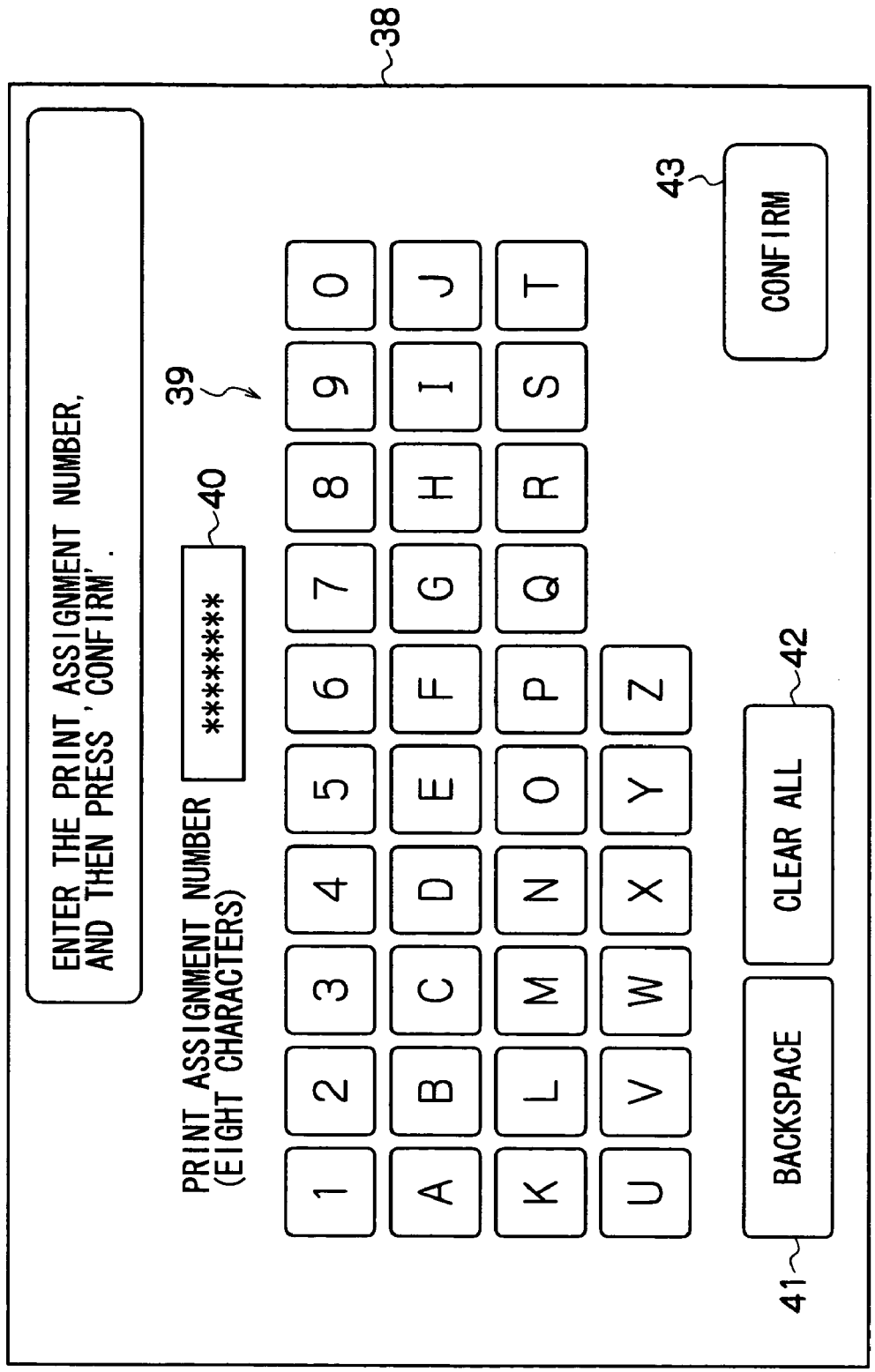
FIG. 9 is a view showing a display example of a print assignment number input screen.

In step 200, a predetermined screen is displayed. That is, when the network printing button 33 of the menu screen 30 is pressed, a sequence presentation screen 35 as shown in FIG. 8 is displayed at the operation panel 9. In this sequence presentation screen 35, messages 36, which represent a sequence of the network printing service, and a confirm button 37 are displayed. The user verifies the sequence and presses the confirm button 37, and then a print assignment number input screen 38 as shown in FIG. 9 is displayed at the operation panel 9. In this print assignment number input screen 38, a button set 39 of numbers, letters and the like is displayed. These buttons are pressed to input a print assignment number, and the print assignment number is displayed at a print assignment number display field 40. It is possible to delete individual characters or all characters by pressing a backspace button 41 or a clear all button 42.

At this print assignment number input screen 38, the user inputs the print assignment number and presses a confirm button 43. Hence, the content information 26 corresponding to the inputted print assignment number can be received from the content recording server 22.

In step 202, the MFP 1 judges whether or not the print assignment number has been inputted and the confirm button 43 pressed. If the confirm button 43 has not been pressed, the routine waits for the print assignment number to be inputted. When the confirm button 43 has been pressed, the routine advances to step 204, and transmits the inputted print assignment number to the content recording server 22. The content recording server 22 transmits the content information 26 that corresponds to the print assignment number transmitted from the client computer 24 back to the client computer 24.

In step 206, it is judged whether or not content data of the content information 26 which is transmitted from the content recording server 22 is image data. More specifically, it is possible, for example, to refer to paper size information in the attribute information 26B included in the content information 26: If this paper size is the L size, which corresponds to photographic printing, it can be judged that the content data is image data, and in other cases it can be judged that the content data is document data. It is also possible to judge by an extension of a filename of the content data. For example, if the extension is "jpg", it is judged that the content data is image data. It is further possible to append a pre-specified identification code, which indicates that content data is image data, at header characters or the like of print assignment numbers when the content information 26 is being recorded to the content recording server 22, and it can be judged that content data is image data if a header character of the print assignment number inputted at the time of network printing is the identification code indicating that the content data is image data. It is further possible to include an identification code which indicates that content data is image data in the attribute information 26B when the content information 26 is being recorded to the content recording server 22, and it can be judged that content data is image data if an identification code included in the received attribute information 26B is the identification code indicating that the content data is image data. Further still, it is possible to append an identification code which indicates that content data is image data to filenames of content data when the content information 26 is being recorded to the content recording server 22, and it can be judged that content data is image data if the identification code indicating that the content data is image data has been appended to a filename of the received content data.

Figure 10:
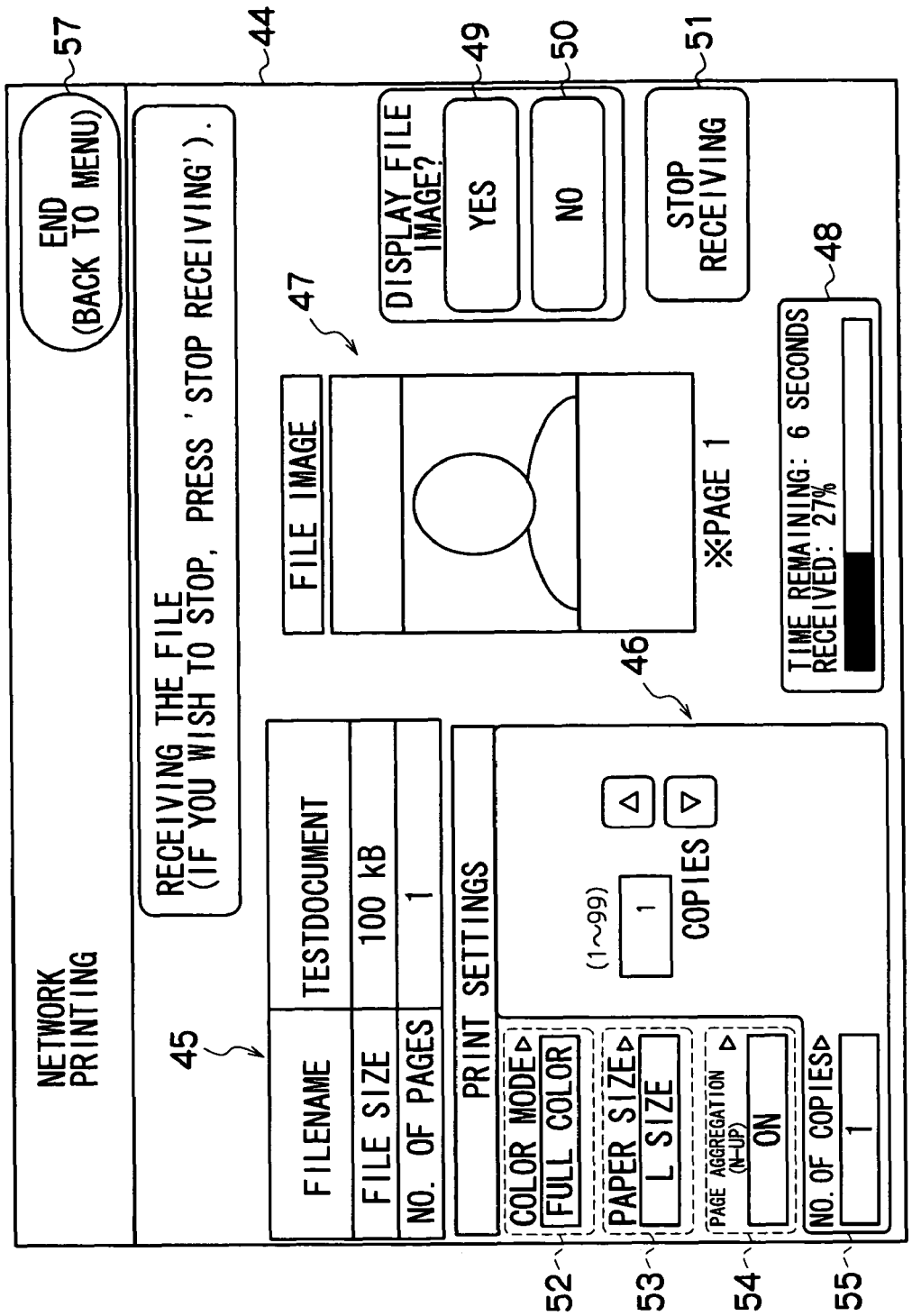
FIG. 10 is a view showing a display example of an image data receiving screen.

If it is judged that the received content data is image data, the routine advances to step 208, and an image data receiving screen 44 for image data, as shown in FIG. 10, is displayed at the operation panel 9.

This image data receiving screen 44 includes a display field 45, a print setting field 46, an image display field 47, a receiving status display field 48, a display approval button 49, a display prevention button 50, a stop receiving button 51, and an end button 57. The display field 45 displays a file name, a file size, a number of pages in the file and the like. The print setting field 46 is for setting a color mode (full color, black and white or the like), a paper size (L size, A4 size, B5 size or the like), page aggregation (2-up, 4-up or the like), a number of copies and so forth. The image display field 47 is displayed in accordance with how much of the image being received has been received. The receiving status display field 48 displays an expected time until receiving is complete, a bar which represents a receiving progress status, and the like. The display approval button 49 is pressed when image display is to be permitted during receiving, and the display prevention button 50 is pressed when image display during receiving is to be prohibited. The stop receiving button 51 is pressed in a case when receiving is to be stopped. The end button 57 is pressed to return to the main menu. Further, the print setting field 46 includes a color mode setting tab 52, a paper size setting tab 53, a page aggregation setting tab 54 and a copy number setting tab 55. The color mode setting tab 52 is for setting the color mode, the paper size setting tab 53 is for setting the paper size, the page aggregation setting tab 54 is for setting page aggregation, and the copy number setting tab 55 is for setting a number of print copies.

Then, in a case of image data, because cases in which it is appropriate, for example, for the color mode to be full color and the paper size to be L size are common, these parameters are automatically fixed. The color mode and paper size or the like are set such that setting changes are prohibited, and the color mode setting tab 52 and paper size setting tab 53 or the like are shown grayed out such that operations thereof are prohibited and the user cannot change these parameters, (shown by broken lines in FIG. 10). In FIG. 10, as an example, only the number of number of copies can be changed.

Figure 11:
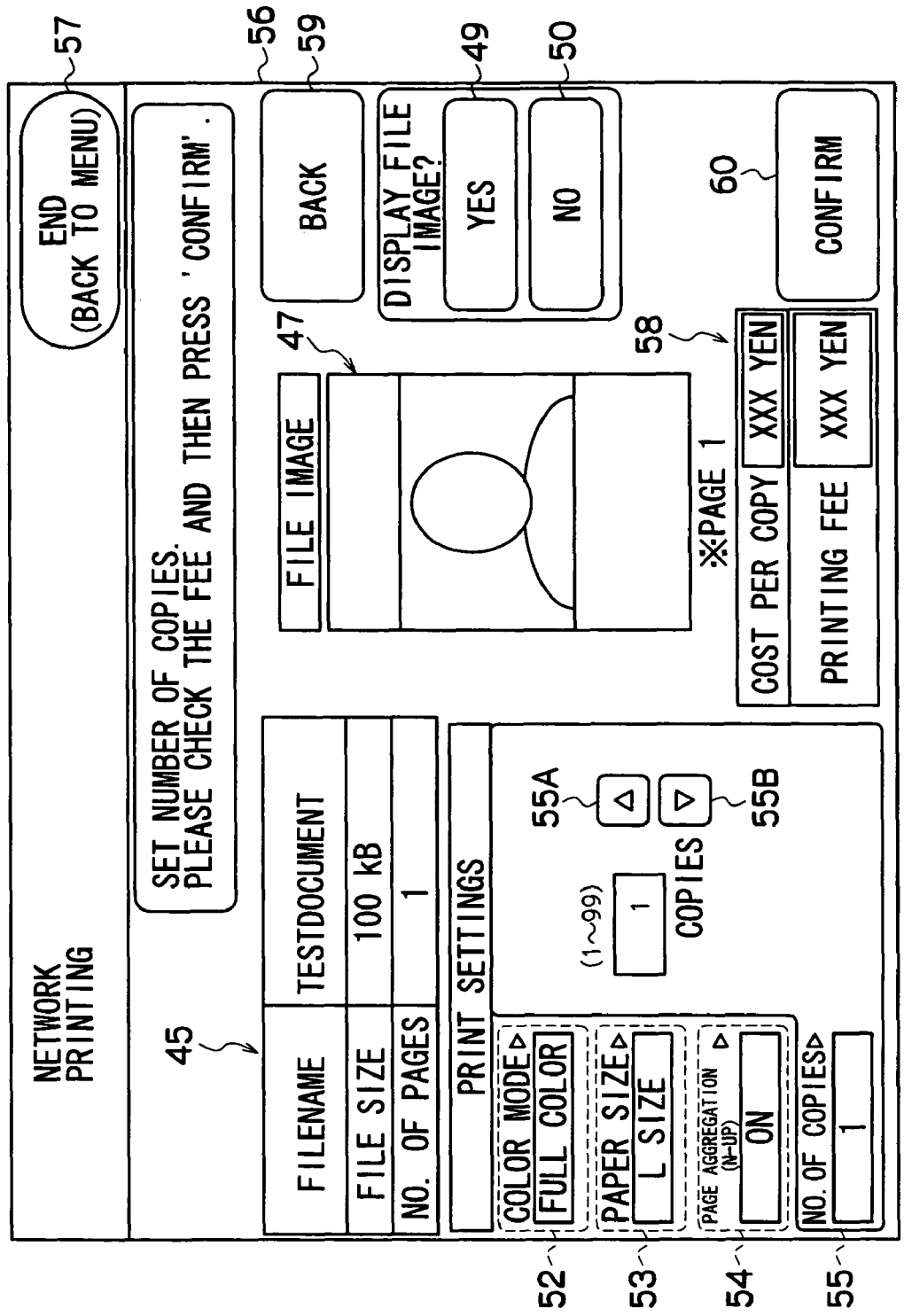
FIG. 11 is a view showing a display example of an image data parameter setting screen.

When reception of the content information 26 including image data is complete, in step 210, parameter setting processing for image data is performed. For this parameter setting processing, an image data parameter setting screen 56, as shown in FIG. 11, is displayed at the operation panel 9. Note that regions that are the same as in the image data receiving screen 44 are assigned the same reference numerals.

As mentioned above, if the received content data is image data, for example, the color mode is automatically fixed at full color and the page size is automatically fixed at L size, and only the number of copies can be changed. The user can alter the number of print copies by appropriately pressing copy number alteration buttons 55A and 55B.

Further, in a case in which the content data is image data, in addition to the color mode and paper size being automatically set, if it is possible to select, for example, paper quality, a paper quality parameter may be automatically set to special glossy paper for photographs. In such a case, an output destination parameter may be automatically set to an ejection aperture specifically for photographs.

Further again, in a case in which the content data is image data, as in image processing which employs a library of image treatments specifically for photographs, types of image processing may be automatically set as parameters. Types of image processing include, for example, various correction processes (gamma correction, shading correction, skintone correction and so forth).

Further still, if the content data is image data, because it is preferable to select a printing method which performs secondary fixing for glossy finishing after primary fixing of a photographic print, the post-processing section 7 may be instructed to perform secondary fixing. In such a case, in order to expedite startup of an unillustrated secondary fixing apparatus of the post-processing section 7, it is possible to transmit a pre-heating command to the post-processing section 7 to instruct pre-heating of the secondary fixing apparatus. This pre-heating command may be transmitted to the post-processing section 7 when it has been judged in step 206 that the content data is image data, or the pre-heating command may be transmitted to the post-processing section 7 at the start of the present routine and a command stopping the pre-heating of the secondary fixing apparatus may be transmitted if and when it has been judged in step 206 that the content data is document data.

Then, in step 210, a printing fee is calculated from a printing cost included in the attribute information 26B, a number of pages of the received image data and a number of print copies. This printing fee is displayed in a fee display field 58. Hence, if a back button 59 is pressed, the routine returns to the previous screen, while if a confirm button 60 is pressed, the parameters required for printing are all confirmed, and the routine advances to charging processing in step 216.

Figure 12:
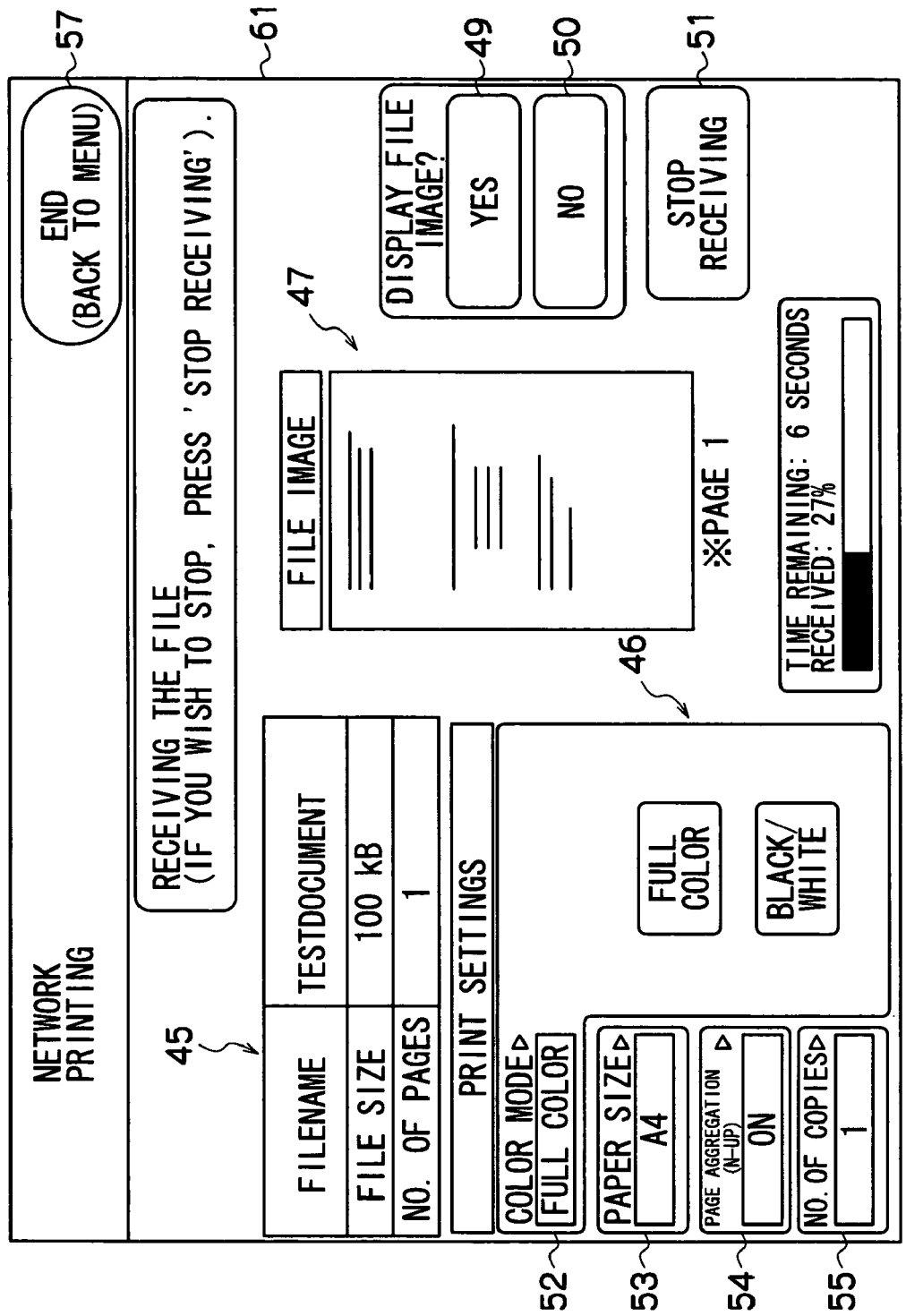
FIG. 12 is a view showing a display example of a document data receiving screen.

On the other hand, if it is judged in step 206 that the received content data is document data, the routine advances to step 212, and a document data receiving screen 61 for document data, as shown in FIG. 12, is displayed at the operation panel 9. Here, portions that are the same as in the image data receiving screen 44 are assigned the same reference numerals. In the case of document data, the color mode and the like may be freely specified by the user. Accordingly, in the document data receiving screen 61, the color mode, the paper size and the like are made selectable in principle.

Thus, because the receiving screens differ between cases of receiving image data and cases of receiving document data, users can easily recognize the category of content data being downloaded.

Figure 13:
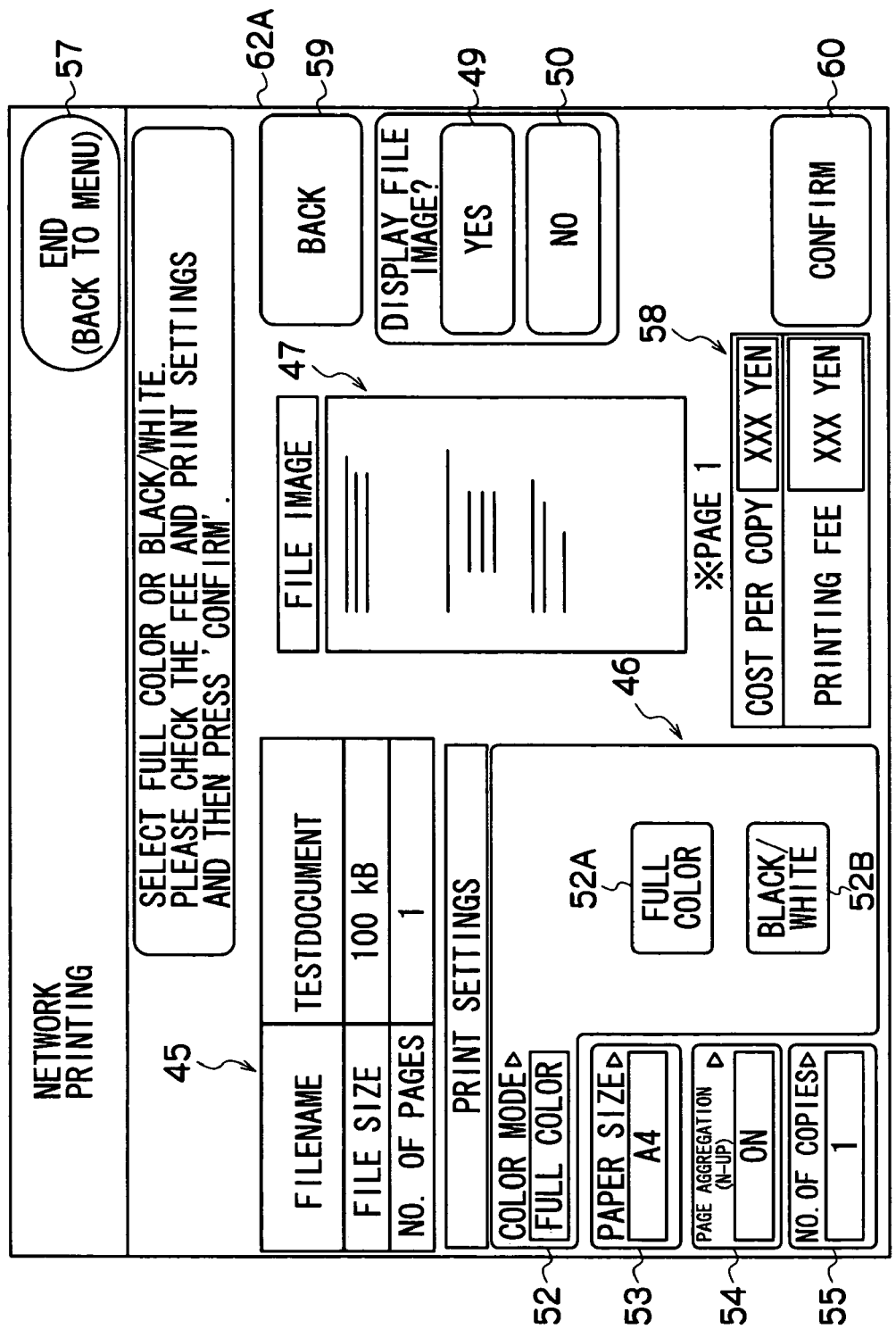
FIG. 13 is a view showing a display example of a document data parameter setting screen.

When reception of the content information 26 including document data finishes, in step 214, processing for setting parameters for the document data is carried out. For this parameter setting processing, document data parameter setting screens as shown in FIGS. 13 to 16 are displayed at the operation panel 9. Here, portions that are the same as in the image data parameter setting screen 56 are assigned the same reference numerals. As mentioned above, when the received content data is document data, the parameters can be freely altered. Accordingly, the user can press the color mode setting tab 52, causing a document data parameter setting screen 62A as shown in FIG. 13 to be displayed, and can set a desired color mode, full color or black/white, by pressing a button 52A or 52B.

Figure 14:
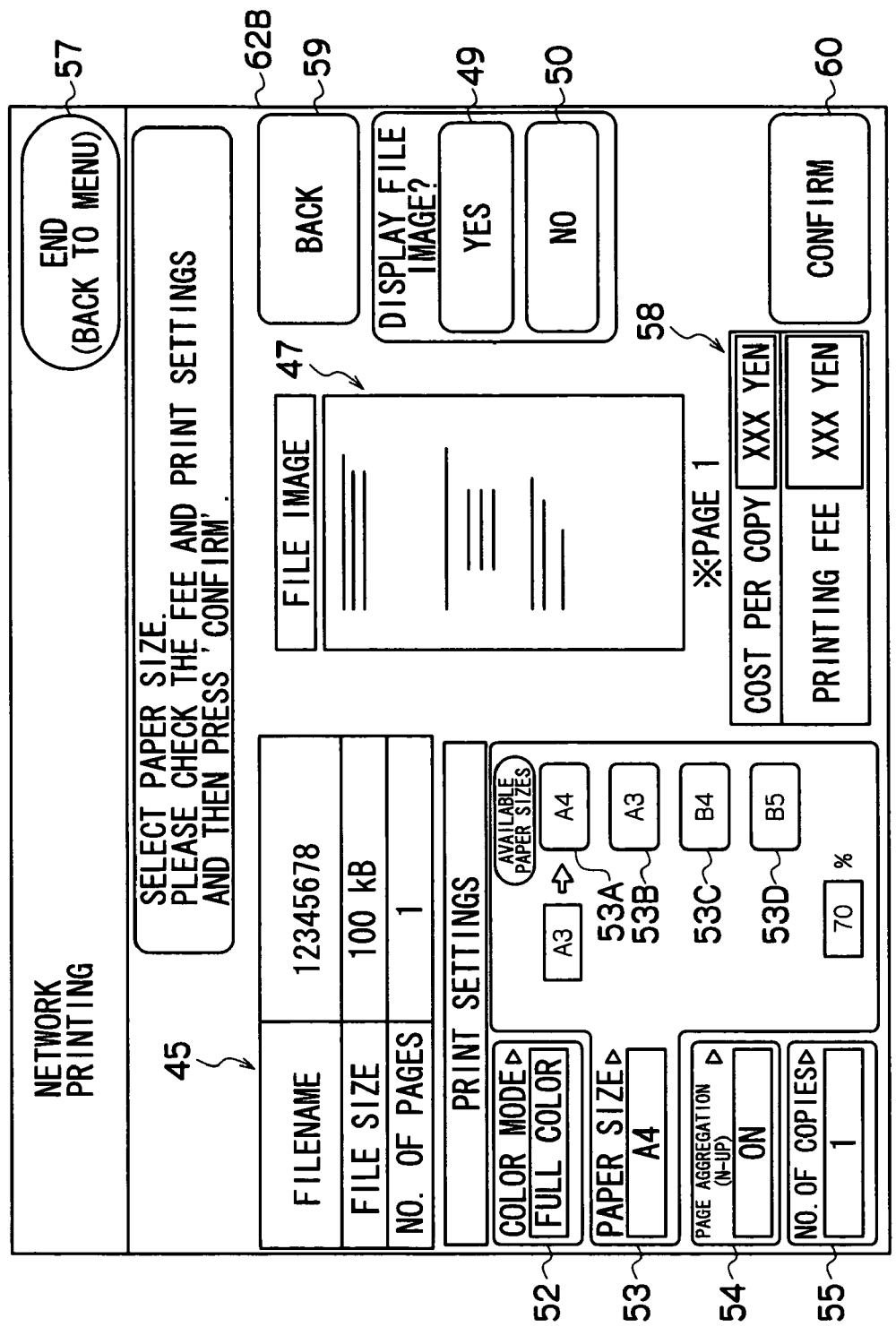
FIG. 14 is a view showing a display example of a document data parameter setting screen.

Similarly, the user can press the paper size setting tab 53, causing a document data parameter setting screen 62B as shown in FIG. 14 to be displayed, and can set a desired paper size by pressing any of buttons 53A, 53B, 53C and 53D to select the paper size.

Figure 15:
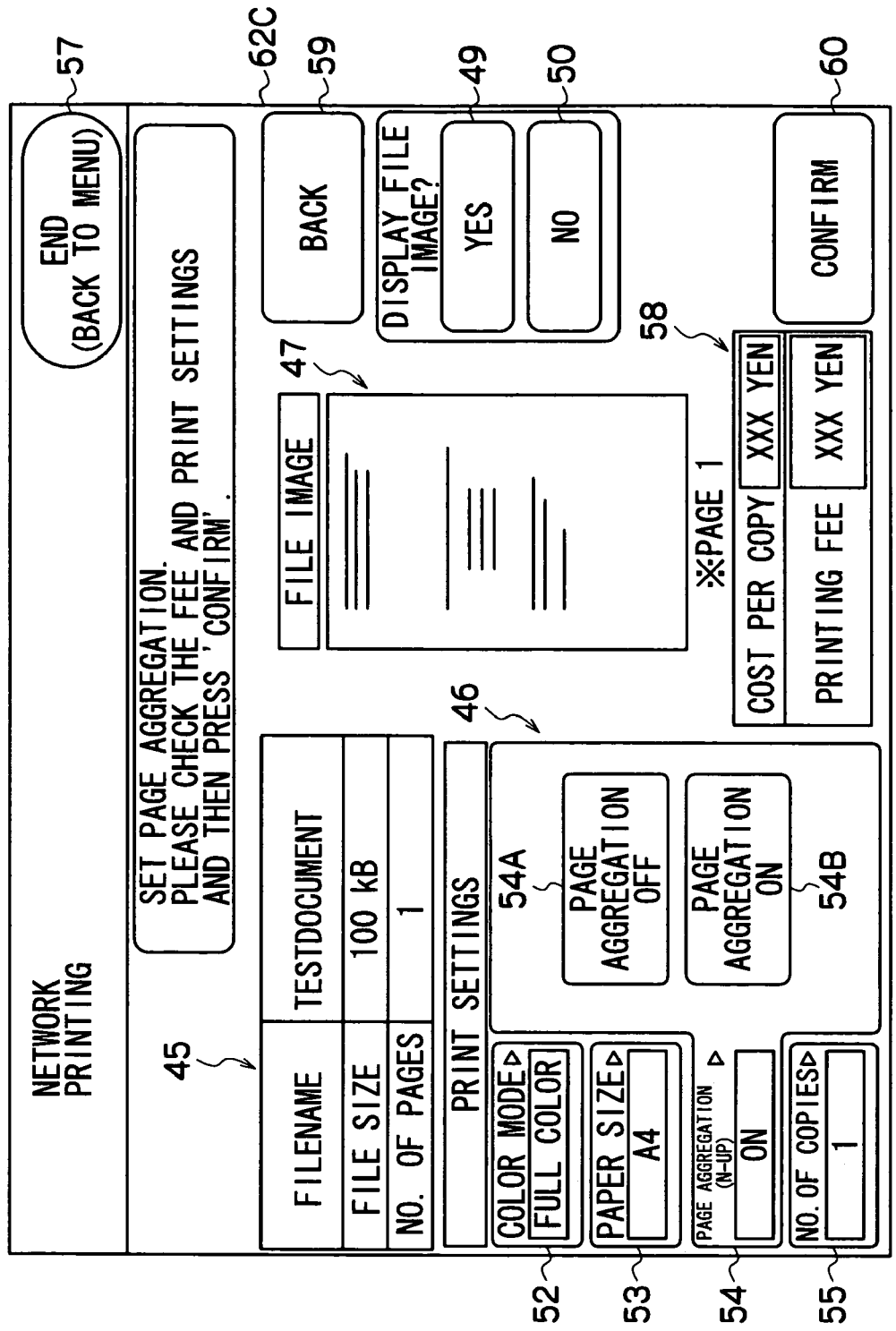
FIG. 15 is a view showing a display example of a document data parameter setting screen.

Further, the user can press the page aggregation setting tab 54, causing a document data parameter setting screen 62C as shown in FIG. 15 to be displayed, and can specify whether or not pages are put together by pressing either of buttons 54A and 54B to set page aggregation on or off.

Figure 16:
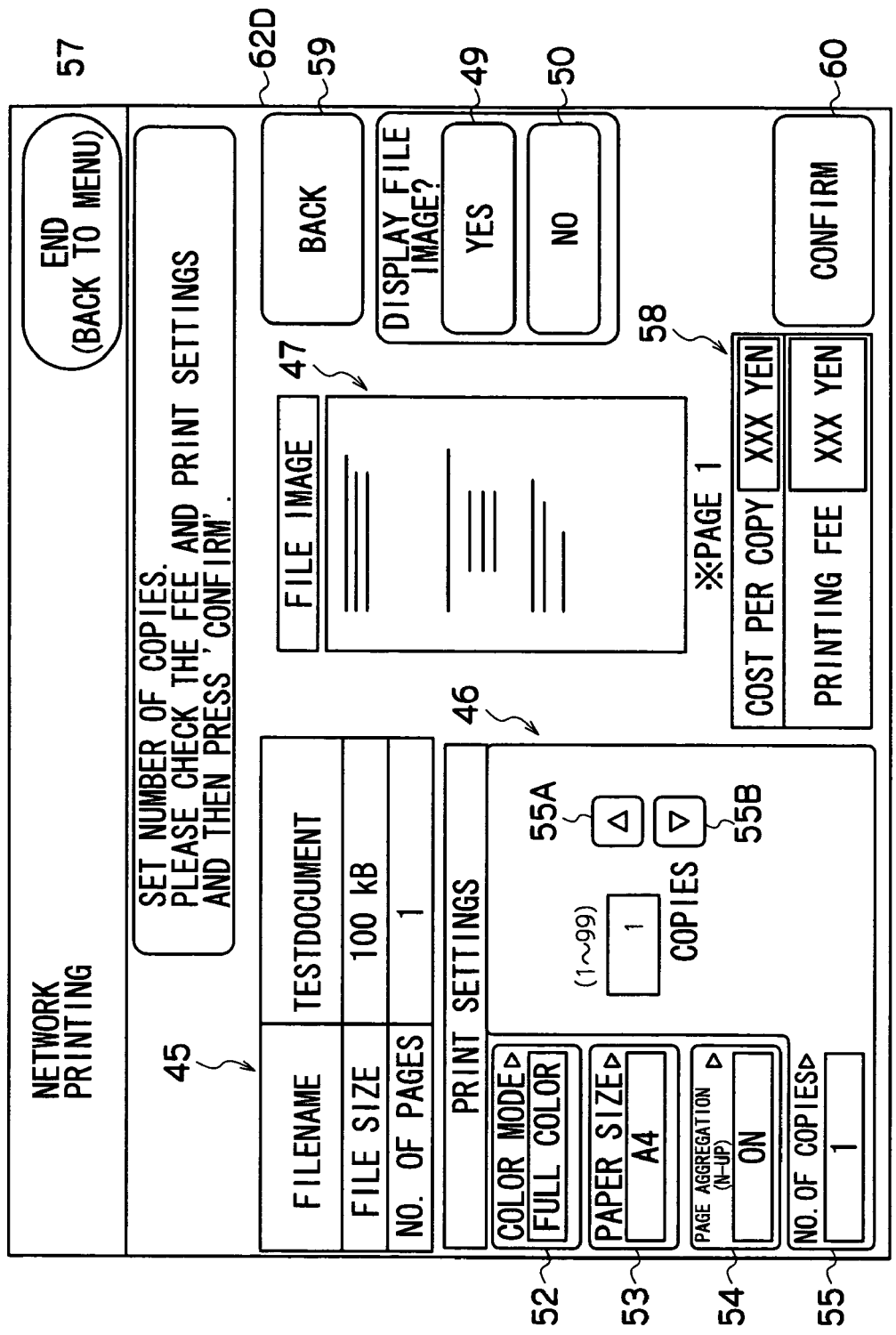
FIG. 16 is a view showing a display example of a document data parameter setting screen.

Further, the user can press the print number setting tab 55, causing a document data parameter setting screen 62D as shown in FIG. 16 to be displayed, and can set a desired number of copies by pressing the copy number alteration buttons 55A and 55B to alter the number of print copies.

When the confirm button 60 is pressed in the document data parameter setting screens, the parameters required for printing are all confirmed, and the routine advances to the charging processing in step 216.

Figure 17:
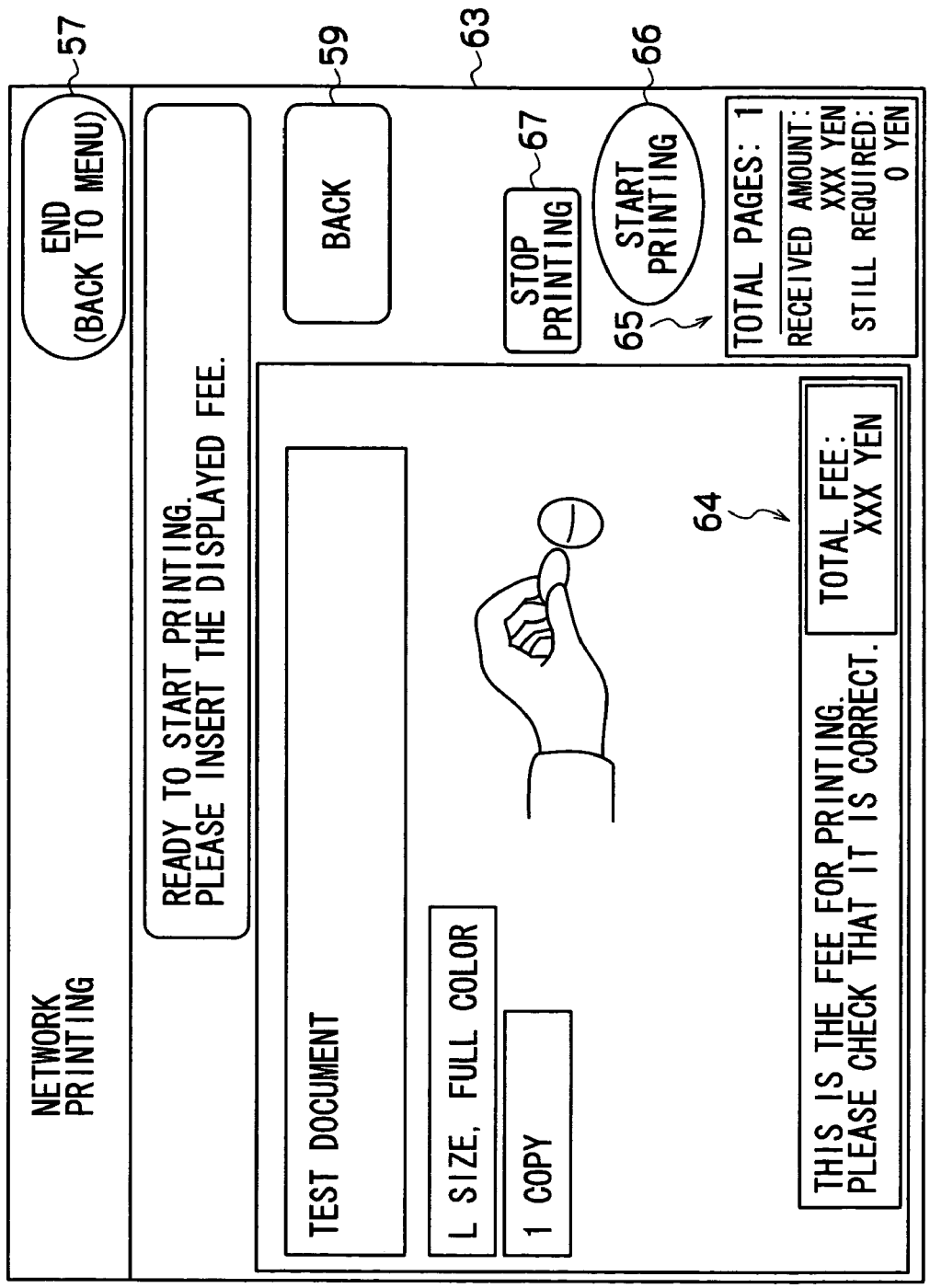
FIG. 17 is a view showing a display example of a printing fee confirmation screen.

In step 216, a printing fee confirmation screen 63 as shown in FIG. 17 is displayed at the operation panel 9. In this printing fee confirmation screen 63, a total amount to be fed into the coin kit 11 is displayed in a total amount display field 64, and a number of coins that have been inserted into the coin kit 11, an inserted amount and a still required amount are displayed in an inserted amount display field 65. Then, when a start printing button 66 in this screen is pressed, printing of the content data that has been downloaded from the content recording server 22 starts, and if a stop printing button 67 is pressed, the printing is stopped.

When the start printing button 66 is pressed, the routine advances to step 218, and printing processing is executed. That is, the received content data and the various printing parameters which have been set in step 210 or step 214 are transmitted to the printer control section 6 via the second system control section 13, and printed by the printer 5. When document data is being printed, differently from the aforementioned printing method for image data in which secondary fixing is carried out after primary fixing, a printing method is selected so as to prioritize speed, with only primary fixing.

Figure 18:
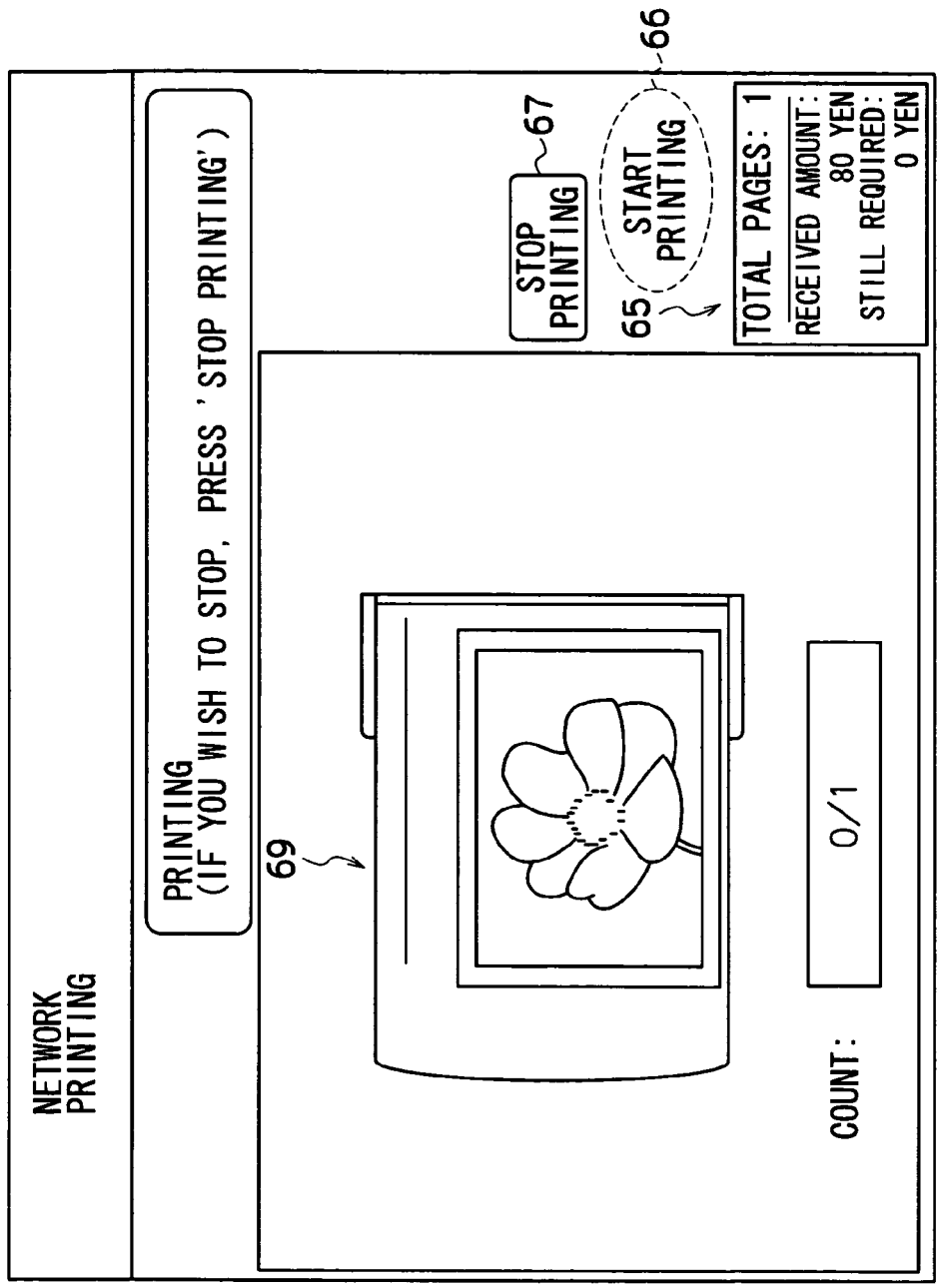
FIG. 18 is a view showing a display example of a printing screen.

During printing, for example, a printing screen 68 as shown in FIG. 18 may be displayed. In the printing screen 68, an example of an image which is actually being printed may be animatedly displayed at an animation display field 69.

Figure 19:
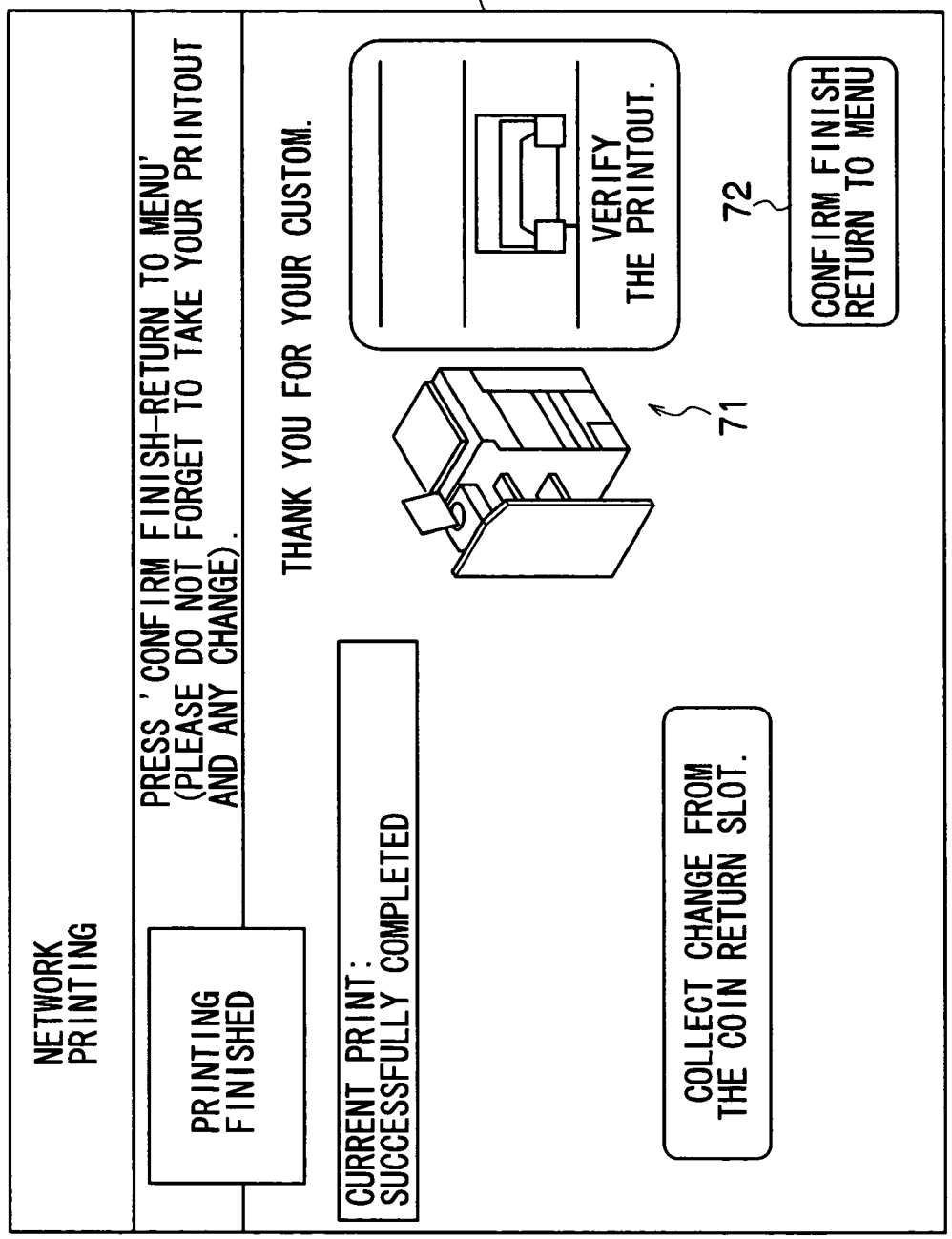
FIG. 19 is a view showing a display example of an image data print completion screen.

When printing is satisfactorily completed, then if the printed content data was image data, a print completion screen 70 as shown in FIG. 19 is displayed at the operation panel 9. In this print completion screen 70, along with a message indicating that printing processing has been satisfactorily completed, an image 71 showing a location to which a photographic print, on which the image data has been printed, is ejected is displayed. When a confirm finish button 72 in this screen is pressed, there is a positive result in step 220, the present routine ends, and the menu screen 30 is displayed at the operation panel 9.

On the other hand, if the printed content data was document data, a print completion screen 73 as shown in FIG. 20 is displayed at the operation panel 9. In this print completion screen 73, along with a message indicating that printing processing has been satisfactorily completed, an image 74 showing a location to which paper on which the document data has been printed is ejected is displayed. Therefore, the user can clearly and simply identify an ejection destination. Thus, because images of print ejection destinations are caused to be different between the print completion screen 70 for image data and the print completion screen 73 for document data, users can clearly and simply identify the ejection destinations. Herein, if the stop printing button 67 in the printing screen 68 is pressed, an image indicating that printing has stopped may be displayed at the operation panel 9.

Further, the present embodiment has structure such that, as a printing method for when printing image data, secondary fixing processing is performed after primary fixing processing in order to provide a glossy finish and raise image quality and, as a printing method for when printing document data, productivity is improved by performing only primary fixing.

However, such a structure is not a limitation. It would be possible to employ various printing processes, such as selecting a sublimation-type printing process when printing image data and selecting an electrophotography-type printing process when printing document data.

Moreover, various variations in the above-described embodiments can be made. For-example, in the first aspect, the image formation device may further includes: an input section, which inputs an ID code associated with the content information of the printing object; and a transmission section, which transmits the inputted ID code via the network to the content recording server, at which the content information and the ID code are stored in association, wherein the receiving section receives the content information corresponding to the transmitted ID code from the content recording server via the network.

In the first aspect, the content information may includes content data of the printing object and attribute information relating to a printing parameter of the content data.

In the first aspect, the attribute information may include paper size information, and if the paper size is a predetermined size which is suitable for photographic printing, the judgement section judges that the content data is image data and the specification section specifies a printing method and printing parameter which are suitable for image data.

In the first aspect, the attribute information may include information representing the category of the content information, and if the category of the content information represents image data, the judgement section judges that the content data is image data and the specification section specifies a printing method and printing parameter which are suitable for image data.

In the first aspect, the judgement section may judge whether the content information is image data or not at least on the basis of a filename and file extension of the content information and, if the content data is image data, the specification section specifies a printing method and printing parameter which are suitable for image data.

In the first aspect, the judgement section judges whether the content information is image data or not on the basis of the ID code of the content information and, if the content data is image data, the specification section specifies a printing method and printing parameter which are suitable for image data.

In the first aspect, the image formation device may further include a display section which displays user interface screens, of which at least a user interface screen subsequent to commencement of receiving of the content information is switched in accordance with the category of the content information.

The display section may display an image of the content information in a screen during receiving, in accordance with how much of the content information has been received.

Otherwise, the display section displays a receiving status field, which represents a status of receiving of the content information, in a screen during receiving.

A second aspect of the invention may provide an image formation system including: a content recording server, which transmits content information of a printing object via a network; a receiving section, which receives the content information of the printing object which has been transmitted from the content recording server via the network; a judgement section, which judges a category of the received content information; a specification section, which specifies a printing method and printing parameter in accordance with the judged category; and a printing section, which prints with the printing method in accordance with the specified printing parameter.

A third aspect of the invention may provide a storage medium readable by a computer, the storage medium storing an image formation program of instructions executable by the computer to perform a function for image formation processing, the function including: a step of receiving content information of a printing object from a content recording server via a network; a judgement step, for judging a category of the received content information; a specification step, for specifying a printing method and printing parameter in accordance with the judged category; and a printing step, for printing with the printing method in accordance with the specified printing parameter.

What is claimed is:

1. An image formation device comprising:
   a receiving section, that receives content information of a printing object from a content recording server via a network;
   a judgment section, that judges a category of the received content information;
   a specification section, that specifies a printing method and printing parameter in accordance with the judged category;
   a printing section, that is configured to fix an image associated with the printing object onto a medium with the printing method in accordance with the specified printing parameter; and
   a secondary fixing section, that is configured for glossy finishing of the image associated with the printing object onto the medium based on the specified printing method, if the category judged by the judgment section requires a secondary fixing of glossy finishing, wherein
   the content information comprises content data of the printing object and paper size information for the printing object, and the judgment section judges whether the content data is image data or document data based on the paper size information.

2. The image forming device of claim 1, wherein the printing parameter is specified according to the specified printing method.

3. The image formation device of claim 1, further comprising:
   an input section that inputs an ID code associated with the content information of the printing object; and
   a transmission section that transmits the inputted ID code via the network to the content recording server, at which the content information and the ID code are stored in association,
   wherein the receiving section receives the content information corresponding to the transmitted ID code from the content recording server via the network.

4. The image formation device of claim 1, wherein the content information comprises content data of the printing object and attribute information relating to a printing parameter of the content data.

5. The image formation device of claim 4, wherein the attribute information includes paper size information, and
   if the paper size is a predetermined size which is suitable for photographic printing, the judgment section judges that the content data is image data and the specification section specifies a printing method and printing parameter which are suitable for image data.

6. The image formation device of claim 4, wherein the attribute information includes information representing the category of the content information, and if the category of the content information represents image data, the judgment section judges that the content data is image data and the specification section specifies a printing method and printing parameter which are suitable for image data.

7. The image formation device of claim 1, wherein the judgment section judges whether the content information is image data or not on the basis of at least one of a filename and file extension of the content information and, if the content data is image data, the specification section specifies a printing method and printing parameter which are suitable for image data.

8. The image formation device of claim 3, wherein the judgment section judges whether the content information is image data or not on the basis of the ID code of the content information and, if the content data is image data, the specification section specifies a printing method and printing parameter which are suitable for image data.

9. The image formation device of claim 1, further comprising a display that displays user interface screens, of which at least a user interface screen subsequent to commencement of receiving of the content information is varied in accordance with the category of the content information.

10. The image formation device of claim 9, wherein the display displays an image of the content information in a screen during receiving, in accordance with how much of the content information has been received.

11. The image formation device of claim 9, wherein the display displays a receiving status field, which represents a status of receiving of the content information, in a screen during the receiving.

12. An image formation system comprising:
a content recording server that transmits content information of a printing object via a network;
an image formation device including:
an receiving section that receives the content information of the printing object which has been transmitted from the content recording server via the network;
a judgment section that judges a category of the received content information;
a specification section that specifies a printing method and printing parameter in accordance with the judged category;
a printing section that is configured to perform fix an image associated with the printing object onto a medium with the printing method in accordance with the specified printing parameter; and
a secondary fixing section, that is configured for glossy finishing of the image associated with the printing object onto the medium based on the specified printing method, if the category judged by the judgment section requires a secondary fixing of glossy finishing, wherein
the content information comprises content data of the printing object and paper size information for the printing object, and the judgment section judges whether the content data is image data or document data based on the paper size information.

13. A non-transitory computer-readable storage medium storing an image formation program, which when executed by the computer, causes the computer to perform a function for image formation processing, the function comprising:
receiving content information of a printing object from a content recording server via a network;
judging a category of the received content information;
specifying a printing method and printing parameter in accordance with the judged category;
fixing of an image associated with the printing object onto a medium with the printing method in accordance with the specified printing parameter; and
performing secondary fixing for glossy finishing of the image associated with the printing object onto the medium based on the specified printing if the category judged requires a secondary fixing of glossy finishing, wherein
the content information comprises content data of the printing object and paper size information for the printing object, and judging whether the content data is image data or document data is based on the paper size information.

14. The image forming device of claim 1, wherein the content information includes content data, and
if content data is image data, the specification section is configured to specify a printing method which performs the secondary fixing, and if the content data is document data, the specification section is configured to specify a printing method which does not perform the secondary fixing.

15. The image forming system of claim 12, wherein the content information includes content data, and
if the content data is image data, the specification section is configured to specify a printing method which performs the secondary fixing, and if the content data is document data, the specification section is configured to specify a printing method which does not perform the secondary fixing.

16. The computer-readable storage medium of claim 13, wherein the content information includes content data and the function further comprising:
selecting a printing method which performs the secondary fixing if the content data is image data; and
selecting a printing method which does not perform the secondary fixing if the content data is document data.

17. The image forming device of claim 14, wherein the judgment section sends a pre-heating command to a printer when the category judged by the judgment section requires pre-heating.

18. The image forming system of claim 15, wherein the judgment section sends a pre-heating command to a printer when the category judged by the judgment section requires pre-heating.

19. The computer readable storage medium of claim 16, the function further comprising:
sending a pre-heating command to a printer when the judged category requires pre-heating.

20. The image forming device of claim 1, wherein the specification section selects a sublimation-type printing process when printing image data, and selects an electrophotography-type printing process when printing document data.

21. The image forming system of claim 12, wherein the specification section is configured to select a sublimation-type printing process when printing image data, and is configured to select an electrophotography-type printing process when printing document data.

22. The computer readable storage medium of claim 13, the function further comprising:
selecting a sublimation-type printing process when printing image data; and
selecting an electrophotography-type printing process when printing document data.

23. The image forming device of claim 1, wherein the judgment section judges that the content data is image data if the paper size information is L size.

24. The image forming device of claim 1, wherein the judgment section sends a pre-heating command to the secondary fixing section when the category judged by the judgment section requires secondary fixing.

25. The image formation system of claim 12, wherein the judgment section judges that the content data is image data if the paper size information is L size.

26. The image formation system of claim 12, wherein the judgment section sends a pre-heating command to the secondary fixing section when the category judged by the judgment section requires secondary fixing.

27. The non-transitory computer-readable medium of claim 13 further comprising:
   judging that the content data is image data if the paper size information is L size.

28. The non-transitory computer-readable medium of claim 13 further comprising:
   sending a pre-heating command for secondary fixing when the category judged by the judging requires secondary fixing.

* * * * *